United States Patent [19]

Lloyd

[11] Patent Number: 4,462,027

[45] Date of Patent: Jul. 24, 1984

[54] SYSTEM AND METHOD FOR IMPROVING THE MULTIPLEXING CAPABILITY OF A LIQUID CRYSTAL DISPLAY AND PROVIDING TEMPERATURE COMPENSATION THEREFOR

[75] Inventor: William W. Lloyd, Richardson, Tex.

[73] Assignee: Texas Instruments Incorporated, Dallas, Tex.

[21] Appl. No.: 121,951

[22] Filed: Feb. 15, 1980

[51] Int. Cl.³ .......................... G09G 3/36; G09G 3/18
[52] U.S. Cl. ..................................... 340/784; 340/713; 340/805
[58] Field of Search ............... 340/784, 805, 802, 713, 340/765

[56] References Cited

U.S. PATENT DOCUMENTS

| | | | |
|---|---|---|---|
| 3,760,406 | 9/1973 | Walton | 340/802 |
| 3,891,306 | 6/1975 | Mitomo et al. | 340/765 |
| 3,891,307 | 6/1975 | Tsukamoto et al. | 340/765 |
| 3,922,667 | 11/1975 | Ueda et al. | 340/805 |
| 3,975,726 | 8/1976 | Kawakami | 340/802 |
| 4,028,692 | 6/1977 | Ngo | 340/784 |
| 4,045,791 | 8/1977 | Fukai et al. | 340/784 |
| 4,048,633 | 9/1977 | Sano | 340/784 |

Primary Examiner—Marshall M. Curtis
Attorney, Agent, or Firm—Robert D. Marshall, Jr.; Leo N. Heiting; Melvin Sharp

[57] ABSTRACT

A system and method for controlling the effective root mean square (RMS) voltage (Veff) across the segments of a liquid crystal display as a function of the frequency of the voltage signal applied thereto and selected parameters of the display package are described. Display parameters such as the thickness of the barrier dielectric layer and the electrical resistance of the liquid crystal material are chosen so that the ON and OFF states of the display are selectively controllable by lowering the frequency of the drive voltage signal applied to the OFF segments (Foff) a predetermined amount below that of the drive voltage signal applied to the ON segments (Fon), thereby decreasing the ratio of the effective RMS voltage Veff to the RMS voltage of the applied voltage signal (Vapp) for the OFF segments as compared to the ratio Veff/Vapp for the ON segments. The number of drive lines which can be effectively multiplexed is thereby increased. By proper selection of drive frequencies and other display parameters, temperature compensation without the need for additional sensors and circuitry is also achieved.

17 Claims, 9 Drawing Figures

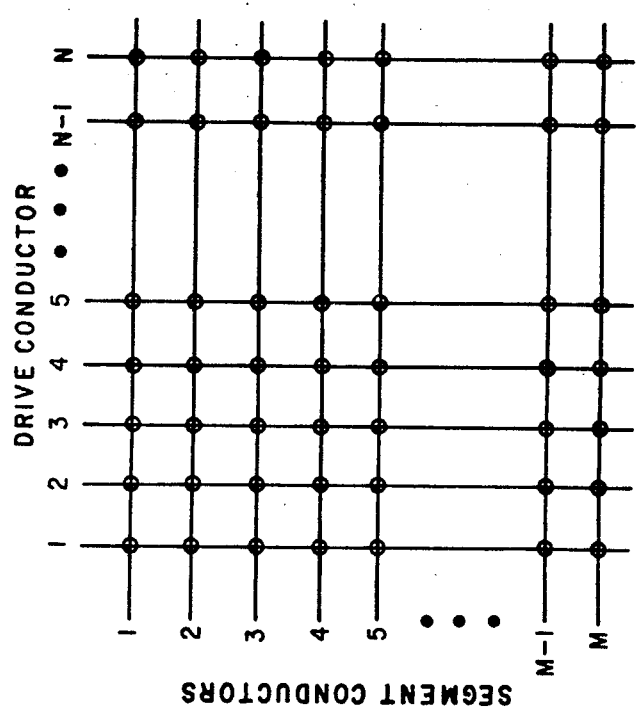
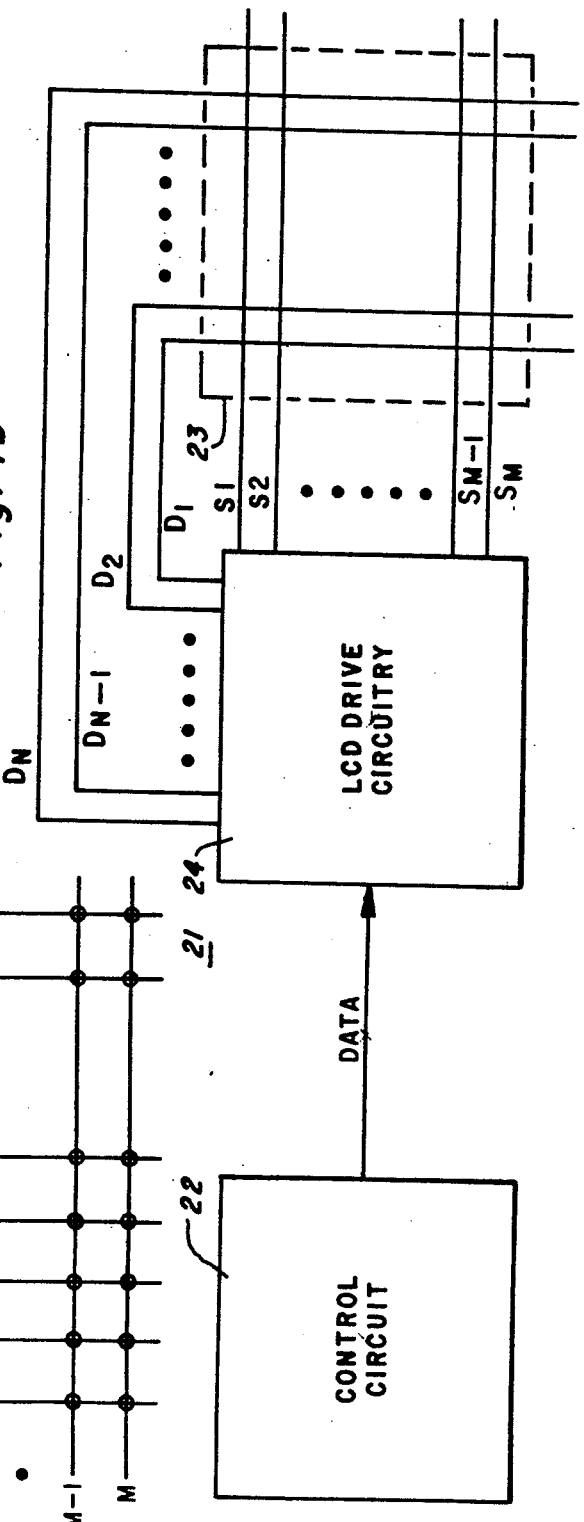
Fig. 4a
Fig. 4b

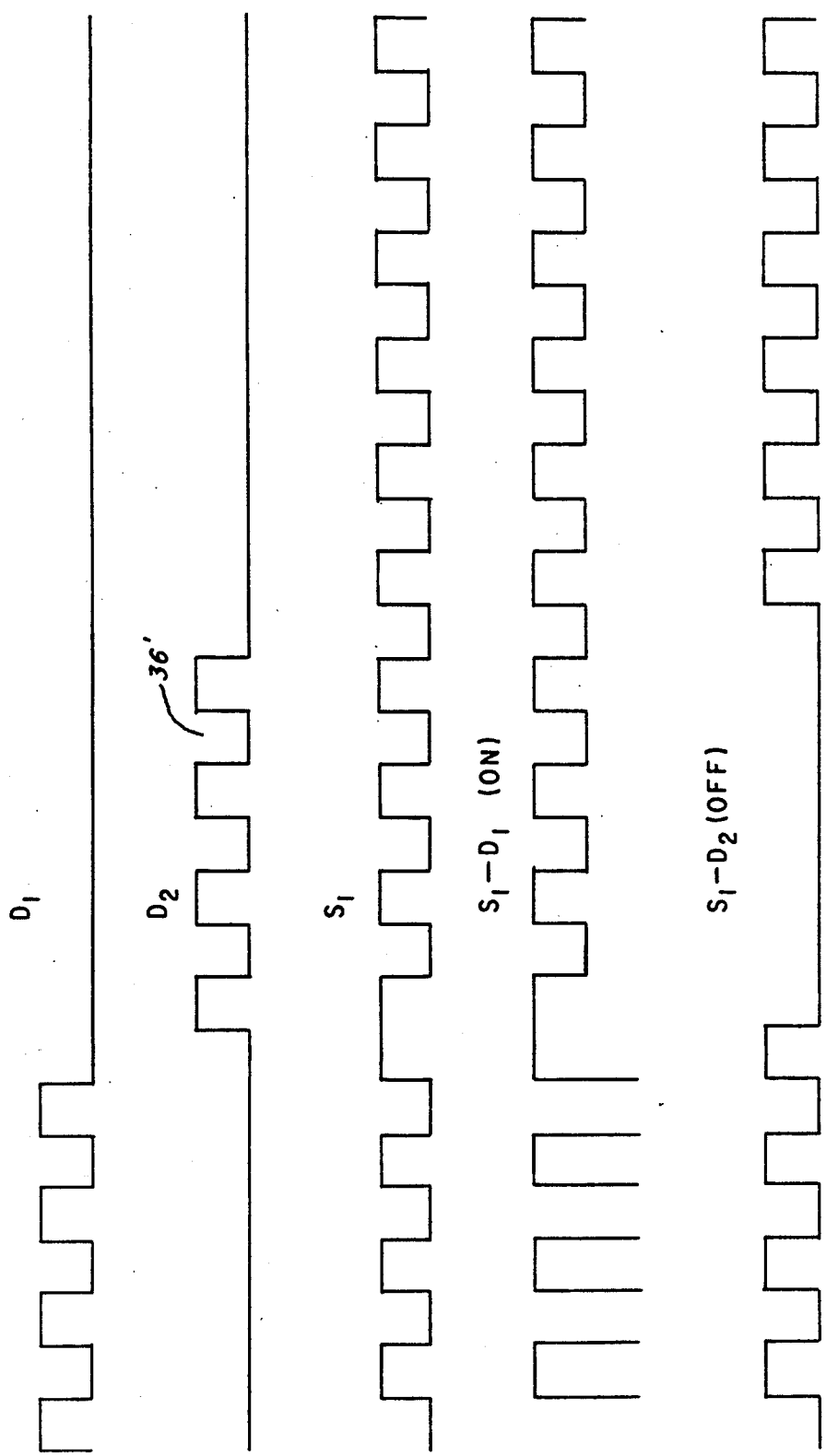

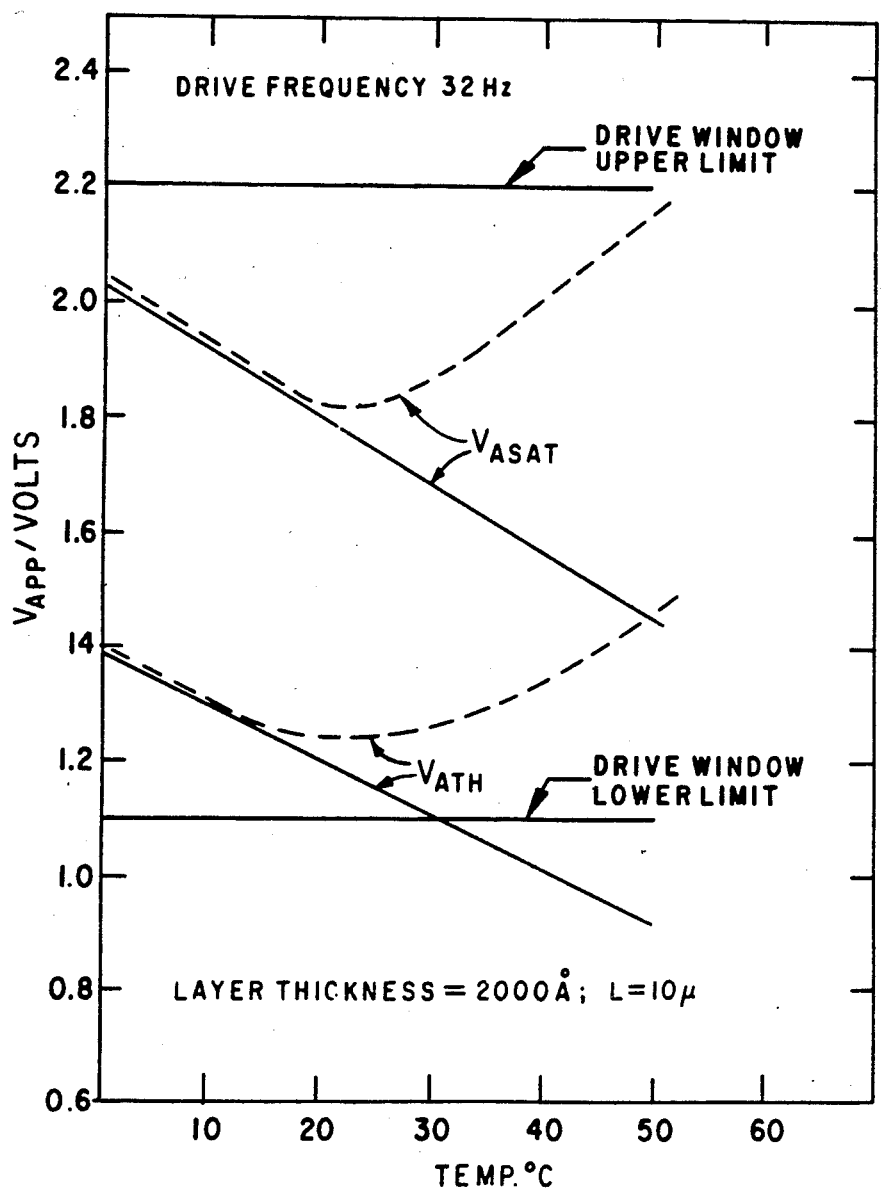

SYSTEM AND METHOD FOR IMPROVING THE MULTIPLEXING CAPABILITY OF A LIQUID CRYSTAL DISPLAY AND PROVIDING TEMPERATURE COMPENSATION THEREFOR

BACKGROUND OF THE INVENTION

This invention relates to liquid crystal displays and, in particular, to a system and method for controlling the drive voltage signals applied to a liquid crystal display.

Liquid crystal display (LCD) devices comprised of a layer of liquid crystal material sealed between first and second substrates with respective first and second sets of character-forming segments formed on opposing inner surfaces of the substrates are well known in the art. Such devices are passive or light-modulating in character and exhibit optical properties which change with the application of an electric field to selected portions thereof. Specifically, when no voltage is applied to the display segments or when the root mean square (rms) voltage across the liquid crystal material is below an intrinsic threshold voltage (Vth) of the material, the display is in a light transparent state, giving it a clear appearance. This is hereafter called the OFF state. Upon application of a rms voltage which is greater than Vth to selected display segments, the liquid crystal molecules between the segments change from a light transparent to a light scattering state, thereby causing a dark portion to appear on the display. This is hereafter called the ON state. By selectively applying voltage signals to particular segments of the display, alpha and/or numeric information is displayable.

LCD devices employed commercially are generally of the "dynamic scattering" or "twisted nematic" types with the "twisted nematic" display being the most popular for calculator and watch applications. The "twisted nematic" structure is achieved by providing an alignment layer adjacent to the liquid crystal material which orients the director axes of the liquid crystal molecules adjacent to one major surface of the device at a predetermined angle, such as for example 90°, with respect to the director axes of the molecules at an opposite major surface of the device. Light energy is twisted according to the predetermined angle as it passes through the device. Polarizers are disposed adjacent to respective outer surfaces of the display substrates for linearly polarizing light passing through the display. The "twisted nematic" structure provides a clearly visible display at diverse viewing angles and under different ambient lighting conditions, although the display is typically not as bright or "jewel-like" in appearance as the "dynamic scattering" type of display.

Voltage drive systems for liquid crystal displays may be of the multiplexed or non-multiplexed type. In non-multiplexed systems, each segment is driven individually and is either fully on or fully off depending upon the value of the root mean square voltage across each segment. Multiplexed systems, on the other hand, employ time-sharing techniques whereby groups of segments are scanned rapidly and selected segments energized in sequence. Multiplexed displays are preferred because they require fewer drive lines and electrical interconnections, thereby reducing space, material requirements and cost. Although liquid crystal materials have the threshold characteristics required for multiplexing, the electro-optic response is angle dependent, temperature dependent and saturates as the optic axis of the sample gets near to alignment with the applied electric field, all of which tend to make multiplexing difficult. Nevertheless, one-third duty cycle multiplexing has been routinely achieved in commercial devices such as calculators, but higher levels of multiplexing are desirable to achieve cost savings, particularly as larger and more complex displays are needed.

It has been shown by Alt and Pleshko in their article entitled "Scanning Limitations of Liquid Crystal Displays", IEEE Transactions on Electron Devices, Vol. ED-21, No. 2, February, 1974, that the maximum number of display drive lines that can be effectively scanned or multiplexed, $N_{MAX}$, is represented by the following equation.

$$N_{MAX} = \left[ \frac{1 + (V_{off}/V_{on})^2}{1 - (V_{off}/V_{on})^2} \right]^2$$

$V_{off}$ = root mean square drive voltage applied to the OFF segments of the display; and
$V_{on}$ = root mean square drive voltage applied to the ON segments of the display Thus, the larger the ratio $V_{off}/V_{on}$ the greater the value of Nmax and the greater the number of lines that can be effectively multiplexed.

One previous technique for increasing the ratio $V_{off}/V_{on}$ was to modify the physical properties of the liquid crystal material to increase $V_{off}/V_{on}$. This approach has not proved successful because of basic material limitations, particularly the control of elastic constants. Another approach is to take advantage of the fact that certain liquid crystal materials, particularly those which exhibit dynamic scattering properties, have a critical frequency above which the dielectric anisotropy changes from a positive value to a negative value. If a voltage signal comprised of a first component having a frequency below the critical frequency and a second component above the critical frequency is applied, the lower frequency signal will attempt to turn the liquid crystal molecules and the higher frequency signal will oppose that turning. By suitable choice of voltage levels for the two signals, Voff can be increased thereby increasing the ratio of Voff/Von. Disadvantages of this technique include the fact that the critical frequency is strongly dependent upon temperature, thereby making temperature compensation critical; power dissipation is increased considerably; the selection of liquid crystal materials is restricted to those with relatively low (2 KHz) critical frequencies; and unwanted effects such as reverse tilt are more likely to occur.

In addition to the problem of multiplexing, liquid crystal materials generally exhibit an intrinsic variation of threshold (Vth) and saturation (Vsat) voltages with temperature which may affect display performance, particularly if the display is designed to operate over a wide range of temperartures. In general Vth and Vsat decrease with increasing temperature and may fall outside of acceptable device limits, particularly at higher temperatures, which may lead to undesirable effects such as ghosting. Prior art approaches to this problem have generally involved the use of a temperature sensor for detecting display temperature and a circuit responsive to the detected temperature for adjusting the root mean square voltage applied to the display to compensate for changes in temperature. Additional sensors and circuitry are required, thereby complicating display fabrication and increasing space and cost requirements.

SUMMARY OF THE INVENTION

It is therefore an object of the invention to provide an improved liquid crystal display system.

It is an additional object of the invention to provide an improved system for multiplexing a liquid crystal display device.

It is an another object of the invention to provide a liquid crystal display system which is suitable for high levels of multiplexing.

It is another object of the present invention to provide an improved system and method for adjusting an effective voltage across a liquid crystal material of a liquid crystal display.

It is yet another object of the present invention to provide an improved system and method of temperature compensation in a liquid crystal display system.

It is still another object of the invention to provide a system and method of temperature compensation in a liquid crystal display system without the use of additional sensors and circuitry.

It is a further object of the present invention to provide a system and method for maintaining the electro-optic response characteristics of a liquid crystal display within prescribed limits for optimum display performance.

These and other objects of the invention are accomplished by providing a liquid crystal display system having a liquid crystal display and drive means for selectively turning on and turning off portions of the display by varying the frequency of an electrical signal applied thereto. The frequency of the signal applied to the ON portions of the display is greater than than the frequency of the signal applied to the OFF portions.

In one embodiment the liquid crystal display system is a multiplexed display system having first and second sets of activatable segment electrodes disposed on opposing major surfaces of a pair of substrates and arranged to form a display pattern. The drive means includes M segment conductors each of which is coupled to a respective group of the first set of segment electrodes for applying a first set of voltage signals thereto and N drive conductors each of which is coupled to a respective group of the second set of segment electrodes for applying a second set of voltage signals thereto in timed relationship with the first set of voltage signals to effect a desired display pattern. The drive means further includes means for scanning the drive conductors in sequence to provide a multiplexed display system of a duty cycle 1/N. The first and second sets of segment electrodes are each preferably arranged in a matrix array of elements comprising N characters or digits each having M segment electrodes. Each of the M segment conductors is connected to N segment electrodes of the first set and each of the N drive conductors is connected to M segment electrodes of the second set.

In another embodiment temperature compensation of the display is provided by selecting the frequency and amplitude of the first set of voltage signals so that the effective root mean square voltage across activated portions of the display is always greater than an intrinsic saturation voltage corresponding to the voltage at which the display is fully on throughout a predetermined temperature range and the frequency and amplitude of the second set of voltage signals are selected so that the effective root mean square voltage across inactivated portions of the display is always less than the intrinsic threshold voltage within the temperature range, thereby compensating the display for variations in the threshold and saturation voltages as a result of changes in display temperature.

Alternatively, the threshold and saturation voltages of the display are maintained within prescribed limits throughout a predetermined temperature range without varying the frequency of the applied voltage signal by choosing a liquid crystal material having a predetermined electrical resistivity versus temperature response within a preselected temperature range so that the reduction in electrical resistance thereof as a result of an increase in display temperature causes a corresponding decrease in the effective root mean square voltage across the display for a given voltage signal thereby adjusting the display response to compensate for temperature-induced variations in the threshold and saturation voltages. In another embodiment the liquid crystal display system includes a layer of dielectric material disposed between the liquid crystal material and both of the substrate/electrode surfaces to provide a barrier between the liquid crystal material and the non-uniform substrate/electrode surfaces. By varying the thickness of the barrier layer, the effective root mean square voltage is adjusted to effect a desired display response. In general, the greater the thickness of the barrier layer, the smaller is the effective root mean square voltage for a given applied voltage signal.

BRIEF DESCRIPTION OF THE DRAWINGS

FIG. 4a is an illustration of the electrical interconnection scheme for a LCD multiplexed drive system;

FIG. 4b is a block diagram of an electronic device including a LCD system having a multiplexed drive circuit of the type shown in FIG. 4a;

FIG. 4d is a timing diagram showing the various drive signals applied to the display by the drive system of FIG. 4c.

FIG. 5 is a graph showing the applied threshold and saturation voltages for a liquid crystal display as a function of the temperature of the display.

DETAILED DESCRIPTION OF A PREFERRED EMBODIMENT

Figure 1:
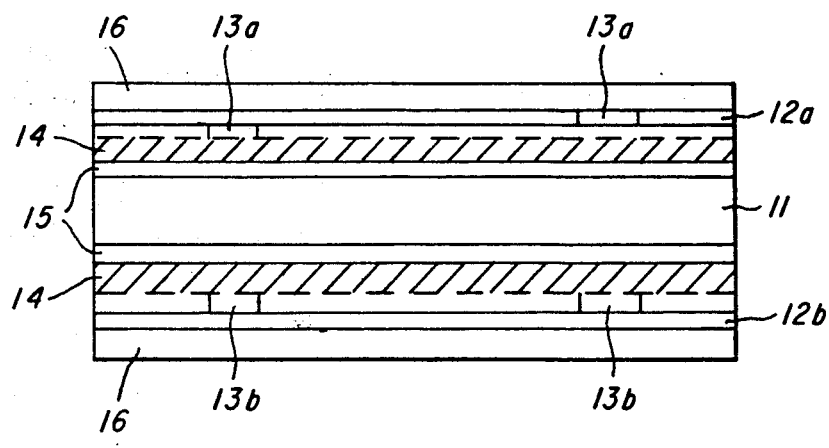
FIG. 1 is a cross-sectional view of a liquid crystal display of the twisted nematic type.

Referring to FIG. 1, a typical liquid crystal display (LCD) device 10, comprised of a liquid crystal material 11 sandwiched between two opposing substrates 12a and 12b is shown. First and second sets of activatable electrodes 13a and 13b, respectively, are disposed on opposing inner major surfaces of substrates 12a and 12b, respectively, in a predetermined pattern to provide a plurality of character forming segments for displaying information. Each electrode of the first set cooperates with a corresponding electrode of the second set to form a display segment. By selectively applying voltage signals across individual segments, a desired display pattern is effected. LCD 10 further includes a dielectric barrier layer 14 interposed between liquid crystal material 11 and the non-uniform substrate/electrode surfaces to provide a uniform surface boundary for liquid crystal material 11. Alignment layers 15 are disposed inwardly of barrier layers 14 for aligning the director axes of the liquid crystal molecules of liquid crystal material 11 in a predetermined direction. For example, in a twisted nematic type of display the director axes of the molecules adjacent to substrate 12a are aligned in a different direction from the liquid crystal molecules adjacent to substrate 12b, the difference being a predetermined angle such as 45° or 90°. Thus light energy is twisted by the predetermined angle as it passes through LCD 10. Polarizers 16, disposed external to substrates 12a and 12b, ensure that light energy passing into and out of LCD 10 is polarized for optimum visibility at different viewing angles.

Figure 2:
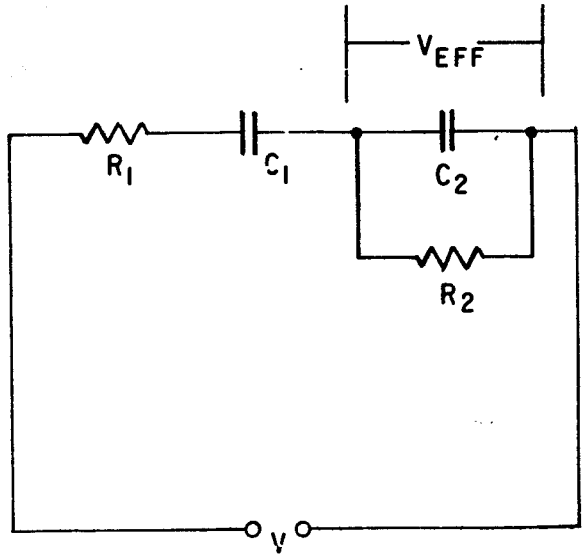
FIG. 2 is a diagram of an equivalent electrical circuit for the liquid crystal display of FIG. 1.

FIG. 2 shows the equivalent electrical circuit for LCD 10. R1 is any series resistance; C1 is the capacitance of barrier layer 14; R2 is the resistance against leakage current and C2 is the capacitance of liquid crystal material 11; Vapp is the root mean square (RMS) value of the voltage signal applied to the display and Veff is the effective RMS voltage across liquid crystal material 11; and V represents the instantaneous voltage applied to display 10. V is expressed by the following equation.

$$V = \sqrt{2} V_{app} e^{-j\omega t} \quad (1)$$

where $\omega = 2\pi F$, F being the resultant frequency of the applied voltage signal, and t is the time in seconds. It is of course a characteristic of liquid crystal displays and liquid crystal materials that their response is dependent upon the RMS value of an applied voltage signal rather than the instantaneous voltage. Another characteristic of liquid crystal materials is that their lifetimes are severely reduced when subjected to a net DC voltage over a prolonged period. Therefore, optimum display performance is obtained by driving the display with an AC signal or by alternating DC signals of opposite polarity.

It will be apparent to those skilled in the art that the ratio of Veff to Vapp can be expressed in terms of the ratio of the impedance of the C2/R2 combination to the total display impedance. Therefore Veff/Vapp can be expressed as follows.

$$V_{eff}/V_{app} = \frac{|Z_2|}{|Z_0|} \quad (2)$$

where $Z_2$ is the impedance of the $C_2/R_2$ combination and $Z_0$ is the total display impedance.

Therefore $V_{eff}/V_{app} =$ (3)

$$\frac{R_2/\sqrt{1 + \omega^2 C_2^2 R_2^2}}{\sqrt{(R_1 + R_2/1 + \omega^2 C_2^2 R_2^2) + \left(\frac{1}{\omega C_1} + \frac{\omega C_2 R_2^2}{1 + \omega^2 C_2^2 R_2^2}\right)}}$$

Further, assuming $R_1 << (1 + \omega^2 C_2^2 R_2^2)$, equation (2) can be simplified and expressed in terms of units per unit area of display.

$$V_{eff}/V_{app} = \left\{ \frac{1}{\sqrt{1 + \omega^2 r^2 C_2^2}} + [1 + \omega^2 r^2 C_2^2] \left[ \frac{1}{\omega r C_1} + \frac{\omega r C_2}{1 + \omega^2 r^2 C_2^2} \right]^{-1} \right\} \quad (4)$$

where $C_1$ and $C_2$ are now expressed in capacitance units per unit area of display and r is the resistance per unit area of display.

Thus it is evident that the ratio Veff/Vapp is a function of the capacitances $C_1$ and $C_2$ and also a function of the product $\omega r$.

Figure 3:
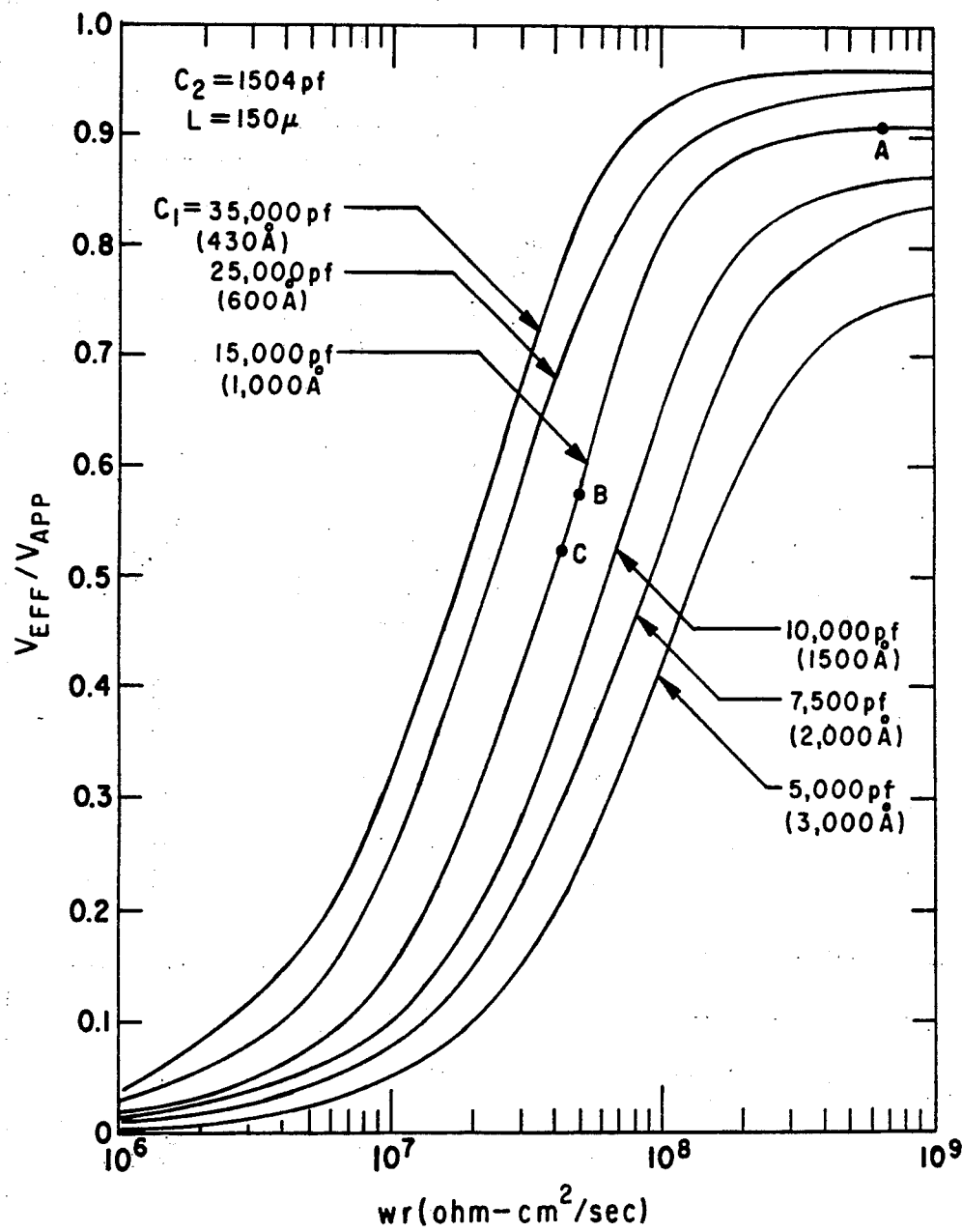
FIG. 3 is a graph showing the ratio of the effective root mean square voltage across the liquid crystal material of the display to the root mean square voltage applied to the display as a function of the product of frequency of the drive voltage signal applied to the display and the resistance of the liquid crystal material.

FIG. 3 shows the ratio Veff/Vapp plotted as a function of the product $\omega r$ based on equation (4) for a typical LCD device. The curves shown in FIG. 3 are for liquid crystal material 11 having a capacitance $C_2$ of 1504 picofarads and a cell gap L of approximately 10 microns. Each curve represents a different capacitance value $C_1$ (thickness) of barrier layer 14. FIG. 3 indicates that the ratio Veff/Vapp increases with increasing values of the product $\omega r$ until $\omega r$ reaches a value of approximately $10^8$, at which point the curves begin to level off. Therefore, by proper selection of liquid crystal material 11 and other display parameters, the electro-optic response of the display is controllable by adjusting the drive frequency for optimum display performance as will be described below.

One can take advantage of the variability of the ratio Veff/Vapp to enhance the multiplexing capability of a LCD system by controlling the RMS voltage applied to both OFF and ON segments of the display so that the RMS voltage applied to the OFF segments, Voff is maintained as close as possible to the corresponding voltage applied to segments in the ON state, Von. The closer the ratio Voff/Von is to unity, the greater is the number of drive lines which can be effectively scanned or multiplexed. The maximum number of drive lines which can be effectively multiplexed, Nmax, is expressed as follows.

$$N_{max} = \left[ \frac{1 + (V_{off}/V_{on})^2}{1 - (V_{off}/V_{on})^2} \right]^2 \quad (5)$$

In accordance with the present invention, the drive voltage signals applied to the segment and backplane electrodes are selected so that the resultant frequency of the voltage signal applied to the ON segments, Fon, is greater than the resultant frequency of the corresponding signal applied to the OFF segment, Foff. As shown in FIG. 3, the greater the drive frequency w the greater is the ratio Veff/Vapp, at least until the product wr approaches $10^8$. Thus individual segments can be turned on and off by varying the frequency as well as the RMS voltage of the drive voltage signal so that Veff is above Vsat for segments in the ON state and below Vth for segments in the OFF state, thereby increasing the ratio Voff/Von and enhancing multiplexing capability. It is further contemplated that with proper choice of Fon and Foff and other display parameters, display segments can be turned on and off without varying $V_{APP}$ between ON and OFF segments.

For example, consider a liquid crystal device having the following parameters:

$V_{th}$ = 1.08 volts at room temperature
$V_{sat}$ = 1.66 volts at room temperature
$r$ = 1.5 × 10⁶ ohm-cm²
$\omega$ = 201 (drive frequency 32 Hz)
$\omega r$ = 3 × 10⁸ ohm-cm²/sec
$C_1$ = 15,000 pf (barrier layer thickness 1000 Angstroms)
$C_2$ = 1504 pf; $L$ = 10 microns Referring to FIG. 3, the ratio Veff/Vapp is approximately 0.91 as indicated by point A on the curve corresponding to $C_1$=15000 pf. The RMS voltage which must be applied to the display to provide an effective voltage equivalent to $V_{th}$ (hereinafter referred to as the applied threshold voltage $V_{ATH}$) is 1.08/0.91 or 1.2 volts and the RMS voltage which must be applied to provide an effective voltage equivalent to $V_{sat}$ (hereinafter referred to as $V_{ASAT}$) is 1.66/0.91 or 1.85 volts. Since Voff must be less than Vath and Von must be greater than Vasat, the maximum number of drive lines which can be effectively multiplexed, N max, is 6 according to equation (5).

Now suppose the value of $\omega$ for the OFF segments is reduced to 33.3 (drive frequency 5.3 Hz) while maintaining the value of $\omega$ at 201 for the ON segments. The product $\omega r$ is correspondingly reduced to $5 \times 10^7$ which corresponds to a Veff/Vapp ratio of 0.6 (point B). The value of Vath equivalent to Vth of 1.08 volts is 1.08/0.6 or 1.8 volts. Thus the value of Voff can be increased accordingly thereby increasing the ratio Voff/Von and increasing Nmax to approximately 400. The above-described technique for controlling the ratio Veff/Vapp by varying the frequency of the drive voltage signals has been empirically demonstrated for various types of liquid crystal materials 11 and is applicable to any LCD system in which a distributed series impedance such as a dielectric barrier layer is used or can be used.

The ratio Veff/Vapp is also a function of the resistance r of the liquid crystal material as well as drive frequency $\omega$. Since Vth and Vsat of liquid crystal material 11 typically vary with display temperature such that increases in temperature cause Vth and Vsat to decrease in essentially linear fashion (see solid lines in FIG. 5), the LCD drive parameters must be selected so that changes in the electro-optic response of liquid material 11 due to temperature variations are compensated for. This is achieved by choosing Vapp, Fon and Foff so that Veff for ON segments is always greater than Vsat and Veff for OFF segments is always less than Vth within a predetermined temperature range for which the display is designed to operate, thereby offsetting changes in Vth and Vsat as a result of display temperature variation.

For example, consider LCD device 10 operating in the temperature range from 5° C. to 50° C. and having the following parameters.

$V_{th}$ = 1.54 volts at 5° C.; 1.18 volts at 50° C.
$V_{sat}$ = 1.82 volts at 5° C.; 1.75 volts at 50° C.
$r$ = 5 × 10⁶ ohms-cm² at 5° C.; 3.5 × 10⁵ at 50° C.
$C_1$ = 15000 pf (barrier layer thickness 1000 Angstroms)
$C_2$ = 1504 pf; $L$ = 10 microns Since the ratio Veff/Vapp tends to be relatively constant for $\omega r$ greater than approximately $3 \times 10^8$, temperature compensation for the ON segments is achieved by choosing Fon so that $\omega r$ is always greater than $3 \times 10^8$ throughout the temperature range 5° C. to 50° C. Choosing the lowest value of r $3.5 \times 10^5$ at 50° C., the value of $\omega$ must be at least $3 \times 10^8/3.5 \times 10^5$ or 857, which corresponds to Fon of 136 Hz. Referring to FIG. 3, the ratio Veff/Vapp is approximately 0.91. Thus the maximum value of Vasat is 1.82 (Vsat at 5° C.)/0.91 or 2 volts. Therefore Vapp must be greater than 2 volts.

Suppose a value of 2.1 volts is chosen for Vapp. To achieve temperature compensation for the OFF segments, Foff is determined as follows. Since Veff for the OFF segments must always be less than 1.18 volts ($V_{th}$ at 50° C.), the ratio Veff/Vapp must be less than 1.18/2.1 or 0.56, assuming Vapp for the OFF segments is unchanged. Referring to FIG. 3, a 0.56 value of the ratio Veff/Vapp equates to a value of $4.5 \times 10^7$ for the product $\omega r$ (see point C). Selecting the highest value of r $5 \times 10^6$ at 5° C. $\omega$ must then be less than $4.5 \times 10^7/5 \times 10^6$ or 9 which corresponds to Foff of 1.4 Hz. Thus by proper selection of Vapp, Fon and Foff, temperature compensation over a wide temperature range is achieved without additional sensors and circuitry.

FIG. 4a shows a typical multiplexed LCD drive system in which M segment conductors are each coupled to a respective group of N segment electrodes on one substrate of the display and N drive conductors are each connected to a respective group of M backplane electrodes on the opposite substrate to form a matrix array. Each intersection of a drive conductor and a segment conductor, indicated by a circle, represents an individual display segment. It is apparent that the matrix arrangement of FIG. 4a permits M×N segments to be driven by only M+N conductors, thereby effecting cost and space savings. The M×N segment electrodes and cooperating M×N backplane electrodes are arranged in a predetermined pattern such as a Figure 8 or a 5×7 matrix on their respective substates to form one or more displayable characters, portions of which are selectively activated to display information as desired.

Referring also to FIG. 4b, a block diagram of an electronic system 21 such as a computing device, electronic calculator or electronic timepiece is depicted. Electronic system 21 includes a control circuit 22 for performing necessary system functions such as mathematical computations, a multiplexed LCD 23 (dotted lines) having M×N individual segments arranged to form a plurality of displayable characters and LCD drive circuitry 24 for driving the display in a multiplexed manner. Specifically, control circuit 22 generates data signals indicative of the information to be displayed on display 23. LCD drive circuitry 24 is responsive to the data signals for transmitting a first set of voltage signals $S_1$-$S_M$ to the segment electrodes of LCD 23 indicative of the ON/OFF states of the segments via respective segment conductors 1-M. Similarly, LCD drive circuitry 24 transmits a second set of voltage signals $D_1$-$D_n$ in timed relationship with first voltage signals $S_1$-$S_M$ to the backplane electrodes of LCD 23 via drive conductors 1-N so that the resultant or effective RMS voltage Veff across the liquid crystal material between corresponding pairs of segment and backplane electrodes is sufficient to turn on certain segments of display 23 but insufficient to turn on others. Second voltage signals $D_1$-$D_N$ are generated in a predetermined sequence by LCD drive circuitry 24 for scanning drive conductors 1-N to provide a multiplexed display system of duty cycle 1/N. By controlling the ratio Veff/Vapp, individual segments are selectively activated and deactivated without substantially varying Vapp between ON and OFF segments thereby enhancing the multiplexing capability of a LCD system.

Figure 4C:
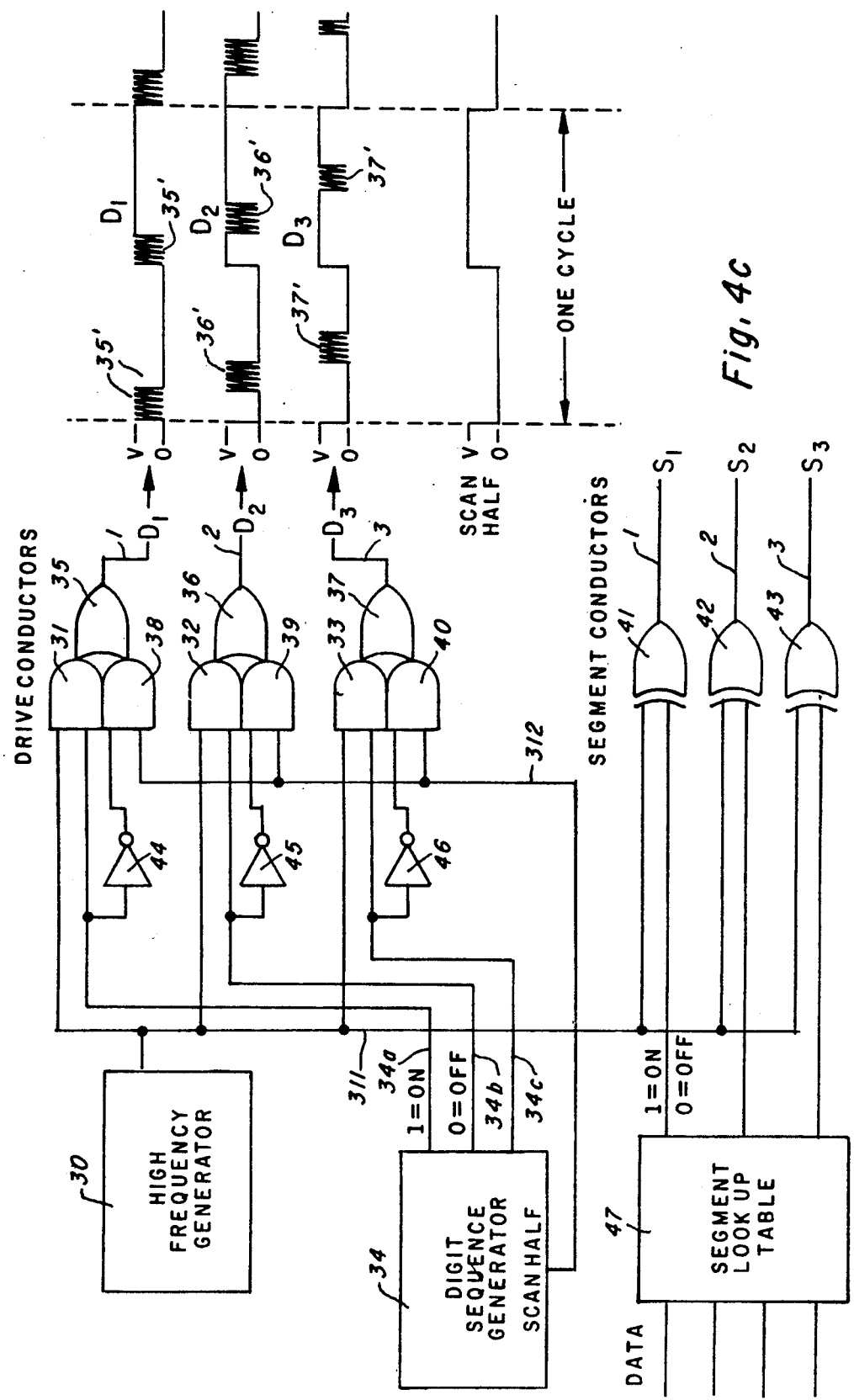
FIG. 4c is a circuit diagram of a drive system for a multiplexed liquid crystal display of duty cycle 1/N.

Referring to FIG. 4c, a multiplexed LCD drive system for effecting frequency switching between ON and OFF segments is shown. While only three drive conductors and three segment conductors are shown in detail, those skilled in the art will appreciate that additional drive conductors and segment conductors can be driven in a similar manner. High frequency generator 30 supplies high frequency square wave signals alternating between zero volts and +V volts in a predetermined frequency to the inputs of AND gates 31, 32 and 33 and EXCLUSIVE-OR gates 41, 42 and 43 via line 311. Digit sequence generator 34 transmits a logic "1" signal in sequence via lines 34a, 34b and 34c to the respective inputs of AND gates 31, 32 and 33 to scan drive conductors 1, 2 and 3 in sequence. For example, when the sequencing signal on line 34a goes high, the outputs of AND gate 31 and OR gate 35 are in synchronization with the output of generator 30, thereby transmitting a series of high frequency pulses over drive conductor 1 for a first predetermined period of time as indicated by the high frequency component 35' in drive signal D1. At the end of the first predetermined period, the sequencing signal on line 34a goes low, thereby causing the outputs of AND gate 31 and OR gate 35 to go low and de-energizing drive line 1 as shown by the zero voltage level in drive signal D1. Next, the sequencing signal on line 34b goes high for a second predetermined period of time, which synchronizes the outputs of AND gate 32 and OR gate 36 with the output of generator 30. This causes a burst of high frequency pulses to appear when drive conductor 2, as indicated by the high frequency component 36' in drive signal D2. After drive conductor 2 is de-energized, drive conductor 3 is energized by synchronizing the outputs of AND gate 33 and OR gate 37 with the output of generator 30 for a third predetermined period of time. Additional drive conductors are energized in a similar manner to effect a scanning sequence.

In addition to generating sequencing signals, digit sequence generator 34 generates a lower frequency SCAN HALF signal which is transmitted via line 312 to the inputs of AND gates 38, 39 and 40. The SCAN HALF signal alternates between zero volts and +V volts during each scan cycle, remaining at zero volts during the first half of the cycle and at V volts during the second half. During the first half of the cycle, the outputs of AND gates 38, 39 and 40 are zero. During the second half, the outputs of AND gates 38, 39 and 40 are high when the respective outputs of inverters 44, 45 and 46 are high, i.e. when the sequencing signals on lines 34a, 34b and 34c are low.

As shown in FIG. 4c, the baseline voltage of drive signals D1, D2 and D3 is in synchronization with the SCAN HALF signal with the high frequency components 35', 36' and 37' superimposed thereon. Alternating the baseline voltage every half cycle has the effect of inverting the waveform every half cycle to maintain zero volts DC across display 23 for longer display life and optimum display performance.

Referring to the bottom portion of FIG. 4c, segment lookup table decoder 47 receives data signals indicative of the information to be displayed from control circuit 22 (FIG. 4b), decodes the data signals and generator a series of segment signals S1, S2 and S3 on segment conductors 1, 2 and 3 via EXCLUSIVE OR gates 41, 42 and 43. For example, if the segment defined by the intersection of drive conductor 1 and segment conductor 1 is turned on, decoder 47 transmit a logic "1" signal to one input of EXCLUSIVE OR gate 41. The other input to exclusive OR gate 41 is the high frequency signal from high frequency generator 30. The output of exclusive OR gate 30 is therefore 180° out of phase with the high frequency signal, as is most clearly shown in FIG. 4d.

FIG. 4d shows the waveforms for the drive signals D1 and D2 and segment signal S1 for the first half of the scan cycle, i.e. SCAN HALF signal 0. Those skilled in the art will recognize that the waveforms comprising drive signals D1 and D2 will be inverted during the second half of the cycle to ensure that the display is subjected to zero volts DC. High frequency components 35' and 36' are each comprised of four distinct pulses transmitted sequentially and segment signal S1 is comprised of a continuous series of such high frequency pulses, which are either in phase or out of phase with the high frequency components 35' and 36', depending upon whether the segments defined by the respective intersections of segment conductor 1 with drive conductors 1 and 2 (hereinafter referred to as segments S1-D1 and S1-D2) are ON or OFF.

In FIG. 4d segment signal S1 is out of phase with high frequency component 35', indicating that segment S1-D1 is ON and in phase with high frequency component 36', indicating that segment S1-D2 is OFF. The resultant waveform for segment S1-D1 indicates that the voltage varies between +V and −V when segment S1-D1 is being scanned (1/N portion of the half cycle) and between +V and zero when the segment is not being addressed (N-1/N portion of the half cycle). The RMS voltage for an ON segment is therefore expressed as follows.

$$V_{on} = \sqrt{\frac{V^2}{N} + \frac{N-1}{N} \cdot \frac{V^2}{2}} = V\sqrt{\frac{N+1}{2N}} \quad (6)$$

Similarly, the resultant waveform for segment S1-D2 indicates that the voltage is zero when segment S1-D2 is being scanned (1/N portion of the half cycle) and varies between +V and zero when the segment is not being scanned (1/N portion of the half cycle). This yields the following RMS voltage for the OFF segments.

$$V_{off} = \sqrt{\frac{N-1}{N} \cdot \frac{V^2}{2}} = V\sqrt{\frac{N-1}{2N}} \quad (7)$$

The frequency of the resultant signal applied to the ON segments is expressed as follows.

$$F_{on} = \frac{2 \times P \times N}{\text{SCAN PERIOD}} \quad (8)$$

where P is the is the number of pulses or cycles for each 1/N portion of the scan cycle. If, for example, N is 3 and the scan frequency is 32 Hz, Fon equals 2×4×3 divided by 1/32, which is equal to 768 Hz. Similarly the frequency of the resultant signal applied to the OFF segments is expressed as follows.

$$F_{off} = \frac{2 \times P \times (N - 1)}{\text{SCAN PERIOD}} \quad (9)$$

For the aforementioned example wherein N is 3 and the scan frequency is 32 Hz, Foff equals 2×4×2 divided by 1/32, which is equal to 512 Hz.

Thus it is evident that the above-described technique of superimposing a series of high frequency signals on a lower frequency scan signal permits display 23 to be multiplexed with only two voltage levels, whereas in conventional multiplexed systems, three or more voltage levels were required. In addition, by proper choice of the high frequency signal and scan period and by taking advantage of the frequency difference between ON and OFF segments, higher levels of multiplexing can be achieved as compared to conventional systems because of increased Voff/Von ratios.

In addition to the advantage of improved multiplexing and temperature compensation, the above-described frequency switching technique allows greater flexibility in the selection of liquid crystal material properties and system parameters and provides improved viewing angle characteristics because liquid crystal molecules in the OFF state are less tilted than in conventional multiplexing.

In another embodiment of the invention the effects of temperature on display response are compensated for without varying the drive frequency. Referring to FIG. 5, the electro-optic voltages $V_{ATH}$ and $V_{ASAT}$ are plotted as a function of temperature in °C. for a LCD device 10 having a cell gap L of 10 microns, barrier layer 14 thickness of 2000 Angstroms and a drive frequency of 32 Hz. Referring also to FIG. 3, if the product $\omega r$ is greater than $3 \times 10^8$ at all temperatures, then the ratio Veff/Vapp remains unchanged. Thus as temperature increases, $V_{ATH}$ and $V_{ASAT}$ decrease in essentially linear fashion (see sloping solid lines in FIG. 5) as do the instrinsic threshold and saturation voltages $V_{th}$ and $V_{sat}$. Note that at approximately 30° C., $V_{ATH}$ drops below the lower limit (see solid horizontal line) of the driven window, which is fixed by the driver design. Now if the device parameters are adjusted such as by doping the liquid crystal material so that the product $\omega r$ is approximately $10^8$ at 20° C. (room temperature), increase in display temperature will lower the value of r thereby decreasing the value of the product $\omega r$ and the ratio Veff/Vapp. As the ratio Veff/Vapp decreases, the value of $V_{APP}$ which is applied to the display to produce a given value of Veff increases. Thus as the temperature increases above 20° C. so do the values of $V_{ATH}$ and $V_{ASAT}$ as indicated by the dotted lines in FIG. 5, thereby offsetting the decrease in $V_{TH}$ and $V_{SAT}$ resulting from increasing temperature and maintaining the electro-optic voltages $V_{ATH}$ and $V_{ASAT}$ within the prescribed drive window limits.

Figure 6:
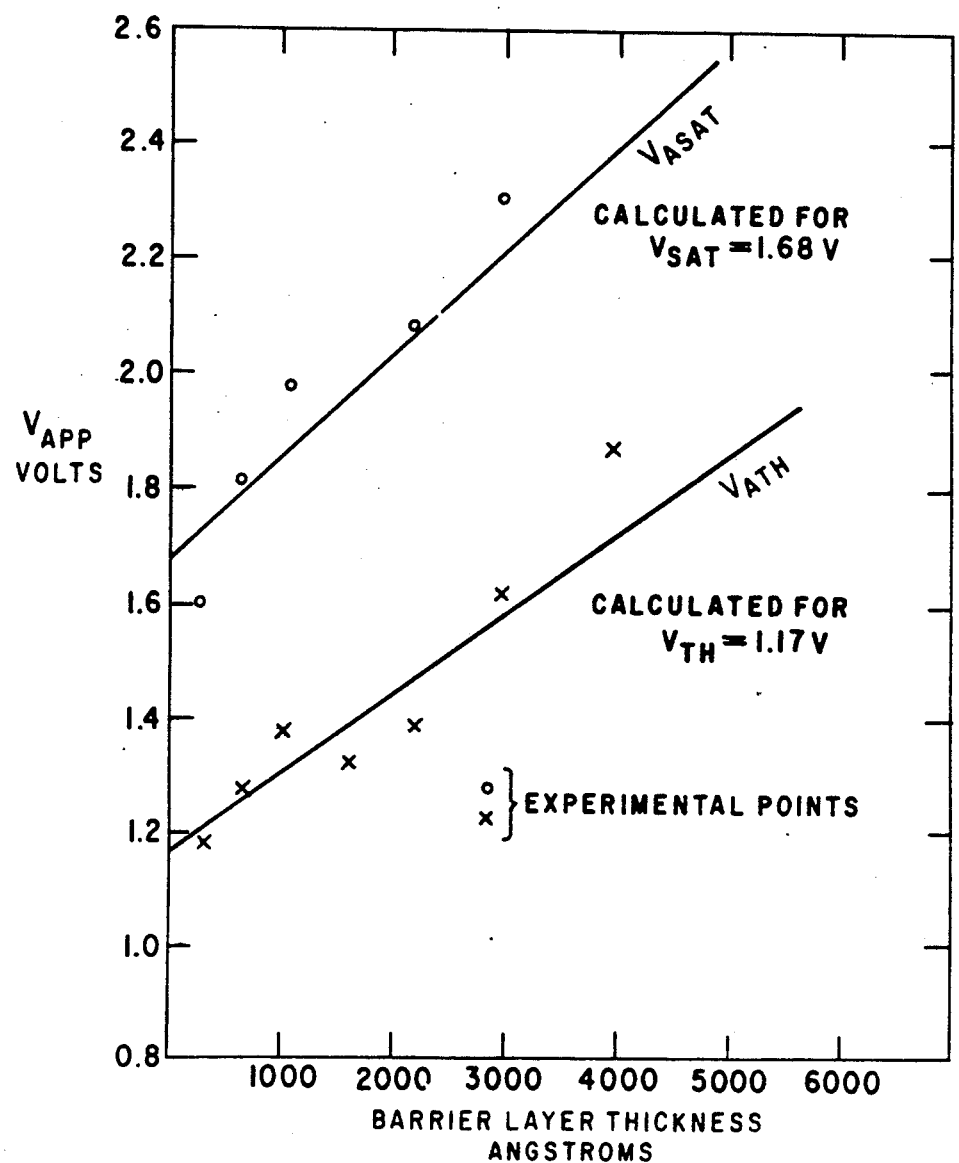
FIG. 6 is a graph showing the applied threshold and saturation voltages as a function of the root mean square voltage of the applied voltage signal and the thickness of the barrier dielectric layer within the display.

When LCD device 10 is operating in the region of FIG. 3 such that the ratio Veff/Vapp is independent of changes in $\omega r$ ($\omega r$ is greater than $3 \times 10^8$) the electro-optic voltages $V_{ATH}$ and $V_{ASAT}$ are adjustable by varying the thickness of the barrier layer. As shown in FIG. 6, $V_{ATH}$ and $V_{ASAT}$ increase with increasing barrier layer 14 thickness. Increasing the thickness of barrier layer 14 results in a corresponding decrease in the value of $C_1$ and hence a decrease in the ratio Veff/Vapp as evident from FIG. 3. For given values of $V_{TH}$ and $V_{SAT}$, the values of the applied voltages $V_{ATH}$ and $V_{ASAT}$ will increase as the ratio Veff/Vapp decreases. Thus the electro-optic voltages $V_{ATH}$ and $V_{ASAT}$ are controllable to maintain them within prescribed drive window limits for optimum display performance by adjusting the thickness of barrier layer 14.

Various embodiments of the invention have now been described. Since it is obvious that many changes and modifications can be made in the above details without departing from the nature and spirit of the invention, it is understood that the invention is not to be limited to these details except as set forth in the appended claims.

What is claimed is:

1. In a liquid crystal display system having a liquid crystal material sandwiched between a pair of substrates with a layer of dielectric material having a predetermined capacitance disposed between said liquid crystal material and said substrates, said liquid crystal display system being responsive to the application of a voltage signal thereto for displaying information on a display thereof, said liquid crystal material having an intrinsic threshold voltage corresponding to a minimum effective root mean square voltage required to begin to drive the display in a first optical state and on intrinsic saturation voltage corresponding to an effective root mean square voltage required for the display to be fully driven in the first optical state, both of which are temperature dependent, a method of adjusting the effective voltage across the liquid crystal material to maintain said threshold and saturation voltages within prescribed limits comprising the steps of:
   a. providing a liquid crystal material having a predetermined electrical resistivity versus temperature response within a preselected temperature range so that a reduction in electrical resistance thereof resulting from an increase in display temperature causes a corresponding decrease in the ratio of the effective root mean square voltage to the root mean square voltage of the applied voltage signal, said ratio being a function of the resistance of the liquid crystal material within the preselected temperature range;
   b. applying a first voltage signal to selected portions of said display for driving said selected portions in the first optical state and a second voltage signal to other portions of said display for driving said other portions in a second optical state thereby effecting a desired display pattern;
   c. allowing the electrical resistance of said liquid crystal material to vary with changes in display temperature so that the effective root mean square voltage across the display resulting from the application of a given voltage signal varies in a predetermined manner, thereby compensating for temperature induced changes in the threshold and saturation voltages within the preselected temprature range without the necessity of changing the voltage signal applied to the display; and
   d. selectively adjusting the thickness of the dielectric layer to control the effective root mean square voltage, said ratio of the effective root mean square voltage to the applied root mean square voltage being a function of the capacitance and hence the thickness of the barrier layer, thereby compensating for changes in the threshold and saturating voltages outside of the preselected temprature range and non-temperature induced changes therein without changing the volage signal applied to the display.

2. A liquid crystal display system for displaying information thereon comprising:

a display including a pair of substrates, and a liquid crystal material sandwiched between said pair of substrates, said liquid crystal material achieving a first optical state when the root mean square of the effective voltage thereacross is less than the threshold voltage thereof and achieving a second optical state when the root means square of the effective voltage thereacross is greater than the saturation voltage thereof, said liquid crystal display having an electrical resistivity, said threshold voltage, said saturation voltage and said electrical resistivity having a variation with temperature; and a drive means electrically coupled to said display for applying a first voltage signal to first selected portions of said display for operating said first selected portions of said display in said first optical state and for applying a second voltage signal to second selected portions of said display for operating said second selected portions of said display in said second optical state, said first and second voltage signals selected having a predetermined amplitude and differing frequencies, whereby said variation with temperature of said electrical resistivity compensates said variation with temperature of said threshold voltage and said saturation voltage such that said first voltage signal results in a root means square of the effective voltage across said liquid crystal material less than said threshold voltage and said second voltage signal results in a root means square of the effective voltage across said liquid crystal material greater than said saturation voltage throughout a predetermined range of temperatures.

3. The liquid crystal display system according to claim 2 wherein the threshold and saturation voltage decrease with increasing temperature and the resistance of the liquid crystal material and the ratio of the root mean square of the effective voltage to the root mean square of the applied voltage also decreases with increasing temperature.

4. The system according to claim 2 wherein the product of the drive frequency times the resistance per unit area of the liquid crystal material is on the order of $10^8$ ohm-cm²/sec at a temperature of approximately 20° C.

5. The system according to claim 2 wherein said first and second substrates have respective first and second sets of electrodes formed on opposing major surfaces thereof to effect a desired display pattern and said display package further includes a distributed capacitance disposed between both of said first and second electrodes and said liquid crystal material.

6. The system according to claim 5 wherein said distributed capacitance is a barrier dielectric layer for providing a barrier between both of the major surfaces with electrodes formed thereon and the liquid crystal material.

7. The system according to claim 6 wherein the display response is controllable by varying the thickness and hence the capacitance of the barrier layer, the ratio of the root mean square of the effective voltage to the root mean square of the applied voltage being a function of the capacitance of the barrier layer.

8. The system according to claim 7 wherein said ratio decreases with increasing barrier layer thickness, thereby compensating for changes in the threshold and saturation voltages without the necessity of varying the applied voltage signal.

9. A liquid crystal display system comprising:
a. first and second substrates affixed together along opposed major surfaces thereof, having respective first and second sets of activatable segment electrodes disposed on said opposed major surfaces, each of said electrodes of said first set cooperating with a corresponding electrode of said second set to form a display segment, said display segments being arranged in a predetermined pattern to form at least one displayable character;
b. a liquid crystal material disposed between said first and second substrates, display segments thereof exhibiting a first optical state or a second optical state responsive to the root means square of the effective voltage applied thereacross, said root means square of the effective voltage applied thereacross being dependent upon the root mean square and upon the frequency of the voltage applied across said first and second segment electrodes of the corresponding display segment; and
c. drive means coupled to said first and second sets of segment electrodes for applying a signal having a predetermined amplitude and a first frequency across said first and second segment electrodes of a selected set of display segments, thereby causing said liquid crystal material of said corresponding selected display segments to exhibit said first optical state and for applying a signal having said predetermined amplitude and a second frequency across said first and second segment electrodes of the remaining display segments not in said selected set, thereby causing said liquid crystal material of said corresponding remaining display segments to exhibit said second optical state.

10. The system according to claim 9 wherein the frequency of the voltage signal applied to said display segments exhibiting said second optical state is greater than the frequency of the voltage signal applied to said display segments exhibiting said first optical state.

11. The system according to claim 9 wherein said drive means includes M segment conductors, each of which is coupled to a respective group of said first set of electrodes for applying a first set of voltage signals thereto and N drive conductors each of which is coupled to a respective group of said second set of electrodes for applying a second set of voltage signals thereto in timed relationship with said first set of voltage signals to effect a desired display pattern, said drive means including means for scanning said drive conductors in sequence to effect a multiplexed display drive system of a duty cycle 1/N.

12. The system according to claim 11 wherein said first and second sets of electrodes are each arranged in a matrix array of elements comprising N digits each having M electrodes, each of said M segment conductors being connected to N different electrodes of said first set and each of said N drive conductors being coupled to M different electrodes of said second set.

13. The system according to claim 11 wherein the maximum value of N is determined by the following:

$$N_{MAX} = \left[ \frac{1 + (V\text{off}/V\text{on})^2}{1 - (V\text{off}/V\text{on})^2} \right]^2$$

where Voff is the root mean square voltage of the voltage signal applied to segments driven in the first optical state and Von is the root mean square voltage of the voltage signal applied to the segments driven in the second optical state.

14. The system according to claim 9 wherein the frequency and amplitude of said first set of voltage signals are selected so that the effective root mean square voltage across the segments driven in the second optical state of the display is always greater than an intrinsic saturation voltage of the liquid crystal material required for the display to be fully driven in the second optical state throughout a predetermined temperature range and the frequency and amplitude of said second set of voltage signals are selected so that the effective root mean square voltage across the segments driven in the first optical state of the display is always less than an intrinsic threshold voltage of the liquid crystal material required for the display to begin to be driven in the second optical state throughout the predetermined temperature range, thereby compensating the display for variations in said threshold and saturation voltages as a result of changes in display temperature.

15. In a liquid crystal display system having a liquid crystal display cell responsive to the application of an electric field thereto for displaying information on a display thereof and drive means for selectively applying a voltage signal across said display cell for activating and deactivating preselected portions thereof, a method of controlling the electric field applied to said display cell, said method comprising the steps of:
  a. selectively applying a first voltage signal having a first predetermined frequency to first portions of said display cell so that an effective voltage across said first portion is greater than an intrinsic threshold voltage required to activate the display, thereby activating said first portions; and
  b. selectively applying a second voltage signal having a second predetermined frequency to second portions of said display cell so that the effective voltage across said second portion is less than said instrinsic threshold voltage, thereby deactivating said second portion, the effective root mean square voltage resulting from the application of a given voltage signal being a function of the frequency of the voltage signal.

16. The method according to claim 15 wherein said first predetermined frequency is greater than said second predetermined frequency.

17. The method according to claim 16 wherein the effective voltage is varied without changing the root mean square voltage of the applied voltage signal so that portions of said display cell are selectively activated and deactivated by varying only the frequency of the applied voltage signal.

* * * * *